April 26, 1966 R. S. SINN 3,248,700

DATA SELECTION SYSTEM

Filed May 31, 1961 9 Sheets-Sheet 1

INVENTOR.
ROBERT S. SINN

BY Morton C. Jacobs

ATTORNEY

INVENTOR.
ROBERT S. SINN
BY Morton C. Jacobs
ATTORNEY

April 26, 1966 R. S. SINN 3,248,700

DATA SELECTION SYSTEM

Filed May 31, 1961 9 Sheets-Sheet 3

INVENTOR.
ROBERT S. SINN

BY Milton C. Jacobs

ATTORNEY

INVENTOR.
ROBERT S. SINN
BY Morton C. Jacobs
ATTORNEY

INVENTOR.
ROBERT S. SINN

BY Morton C. Jacobs

ATTORNEY

INVENTOR.
ROBERT S. SINN
BY Morton C. Jacobs
ATTORNEY

INVENTOR.
ROBERT S. SINN
BY Morton C. Jacobs
ATTORNEY

INVENTOR.
ROBERT S. SINN
BY Morton C. Jacobs
ATTORNEY

April 26, 1966 R. S. SINN 3,248,700

DATA SELECTION SYSTEM

Filed May 31, 1961 9 Sheets-Sheet 9

INVENTOR.
ROBERT S. SINN

BY Morton C. Jacobs

ATTORNEY

United States Patent Office 3,248,700
Patented Apr. 26, 1966

3,248,700
DATA SELECTION SYSTEM

Robert S. Sinn, Seaside Park, N.J., assignor to Ultronic Systems Corp., Pennsauken, N.J., a corporation of Delaware Filed May 31, 1961, Ser. No. 113,690
17 Claims. (Cl. 340—152)

This invention relates to data storage systems and particularly to a manually operable system for selecting the category of information to be read from the storage and presented to the operator.

This invention includes a manually operable console that is particularly adapted to be used with the stock transaction information system described in my copending patent application "Data Storage System," Serial No. 102,882, filed April 13, 1961. This console is arranged so that a plurality of stock-identifying indicia can be chosen, which, in turn, establishes the operating condition of a plurality of selector switches. These switches make connections to a central data store to obtain the stock transaction information associated with the chosen stock identifier. This information is returned to the console where it is presented to the operator. The stock information is arranged in categories such as prices that are High, Low, Last, etc. Separate selector switches are used to establish the category of information to be obtained.

It is an object of this invention to provide a new and improved manually operable system for selecting and displaying stock transaction information.

Another object is to provide a new and improved data selection system that is manually operable.

Another object is to provide a new and improved manually operable system for selecting locations of a data storage system to read.

Another object is to provide new and improved selector-switch wheels that are manually operable.

In an embodiment of this invention a manually operable console includes a plurality of signal-producing elements for establishing different signal combinations identifying different stocks and categories of transaction information. A signal storage system has different portions corresponding to the different stocks and information categories, and connections are made to those portions in accordance with the selected signal combinations. Thereby, stored signals are obtained and supplied to display portions of the console; and the information on display is identified by the operator with the selected stock by the visible conditions of the signal producing elements.

A feature of one embodiment of this invention is the use of manually rotatable members for establishing different signal combinations for the stock identifiers. The rotatable members are retained in position by detents; and when rotated, the detents are actuated to release certain selector-switch keys. The latter keys are used to select the category of information to be obtained.

The foregoing and other objects of this invention, various features thereof as well as the invention itself, may be more fully understood from the following description when read together with the accompanying drawing, in which.

Figure 10:
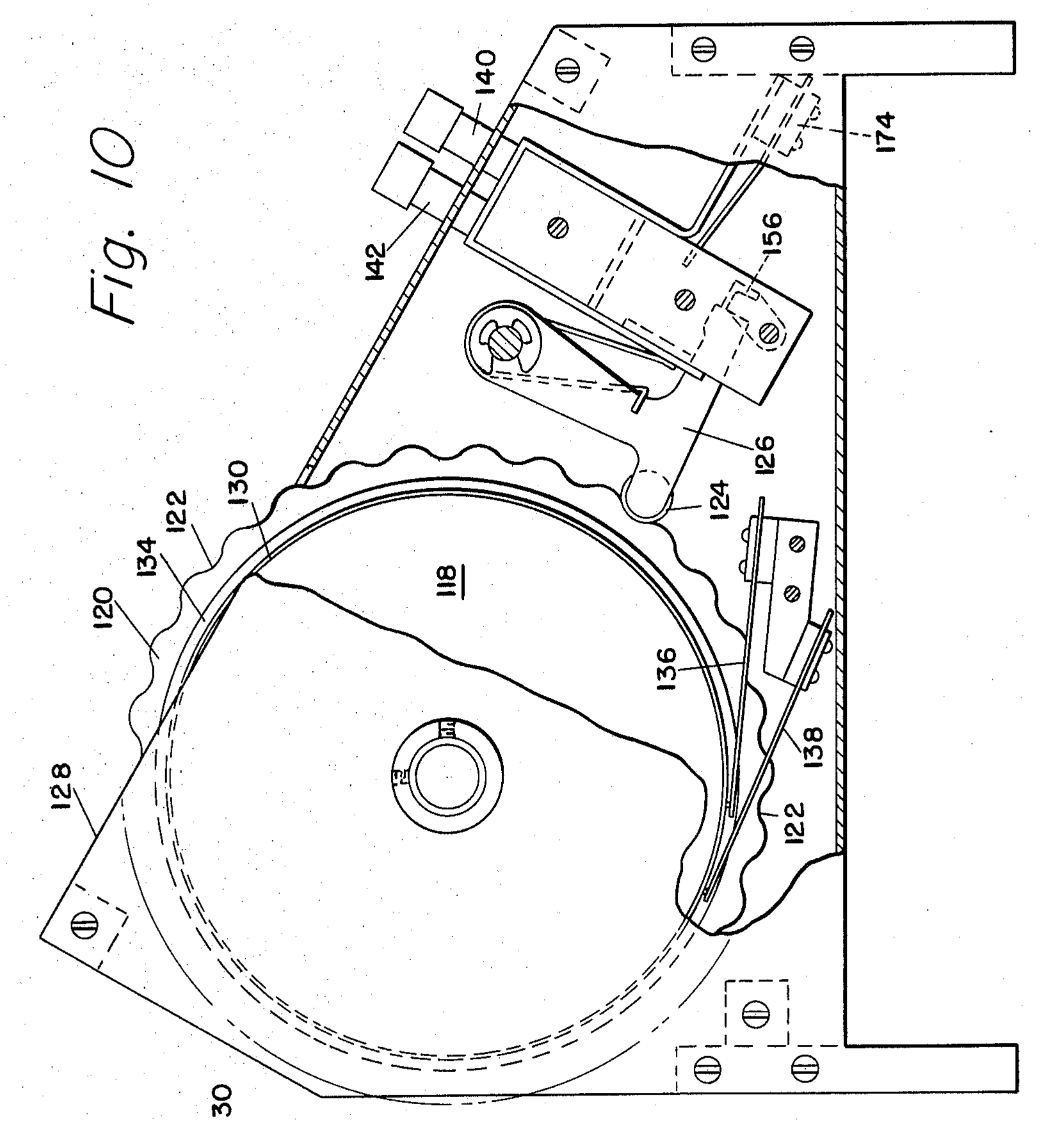
Figure 16:
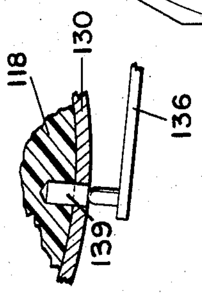
Figure 11:
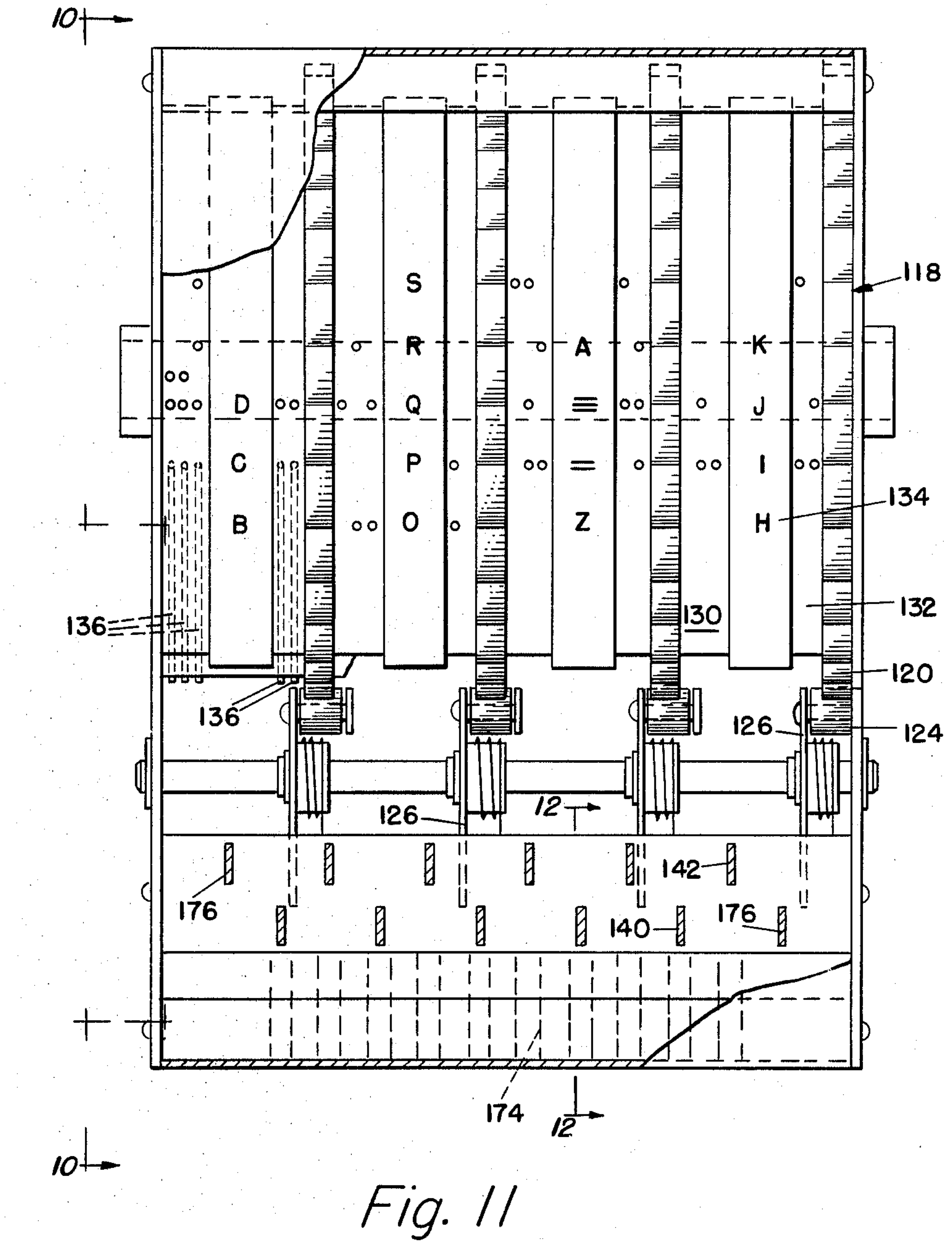
Figures 12, 14:
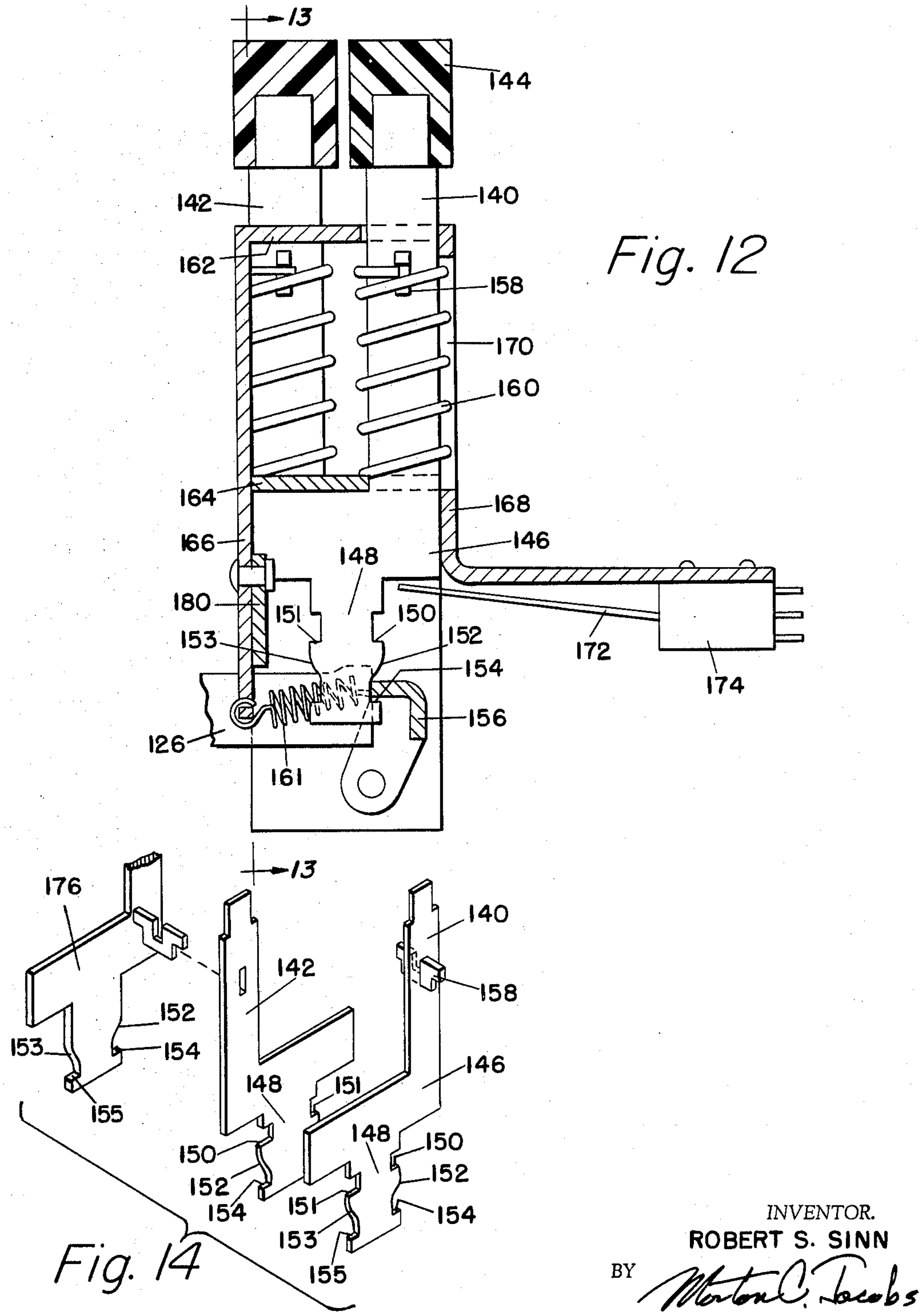
Figure 13:
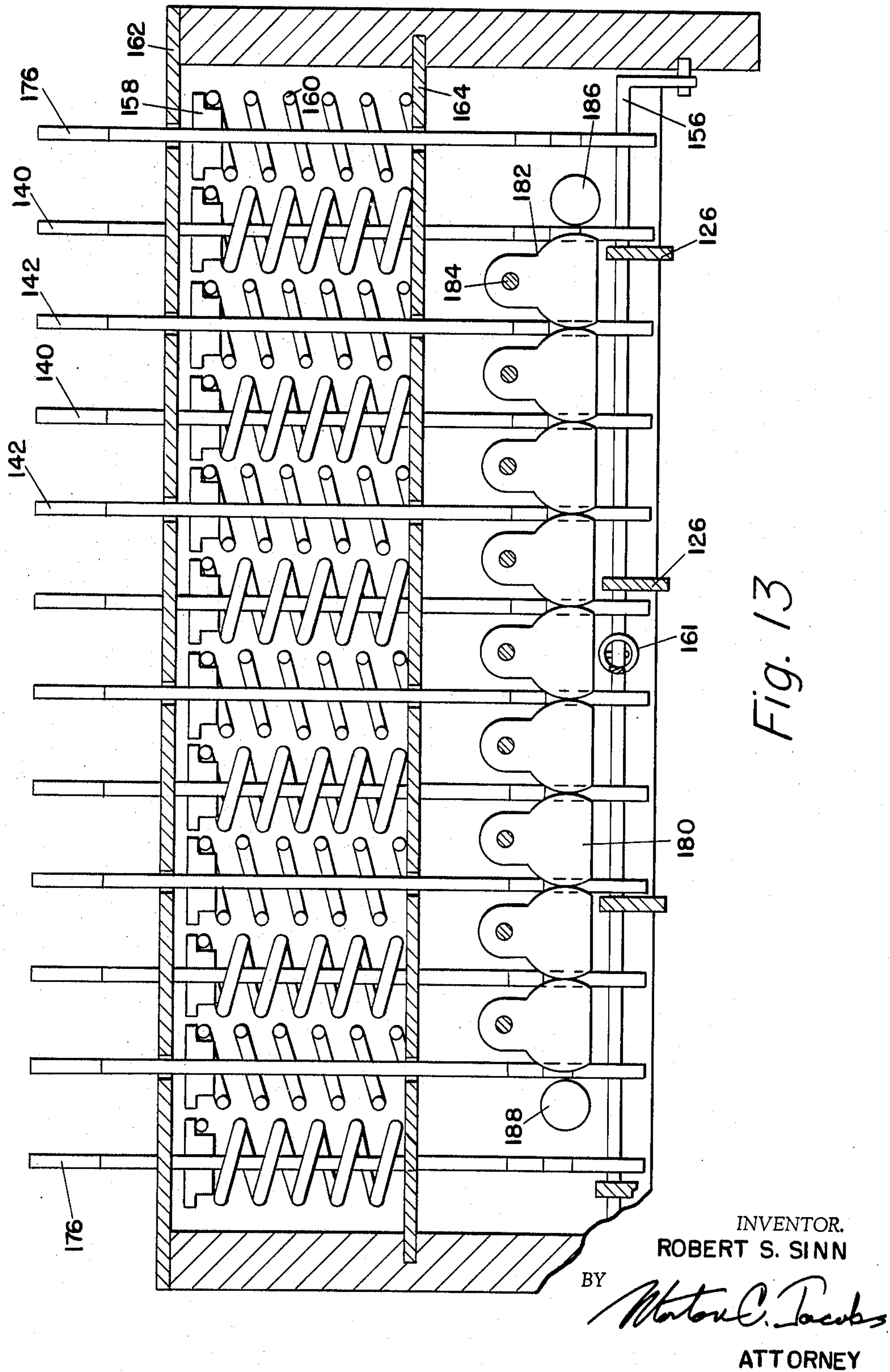
Figure 15:
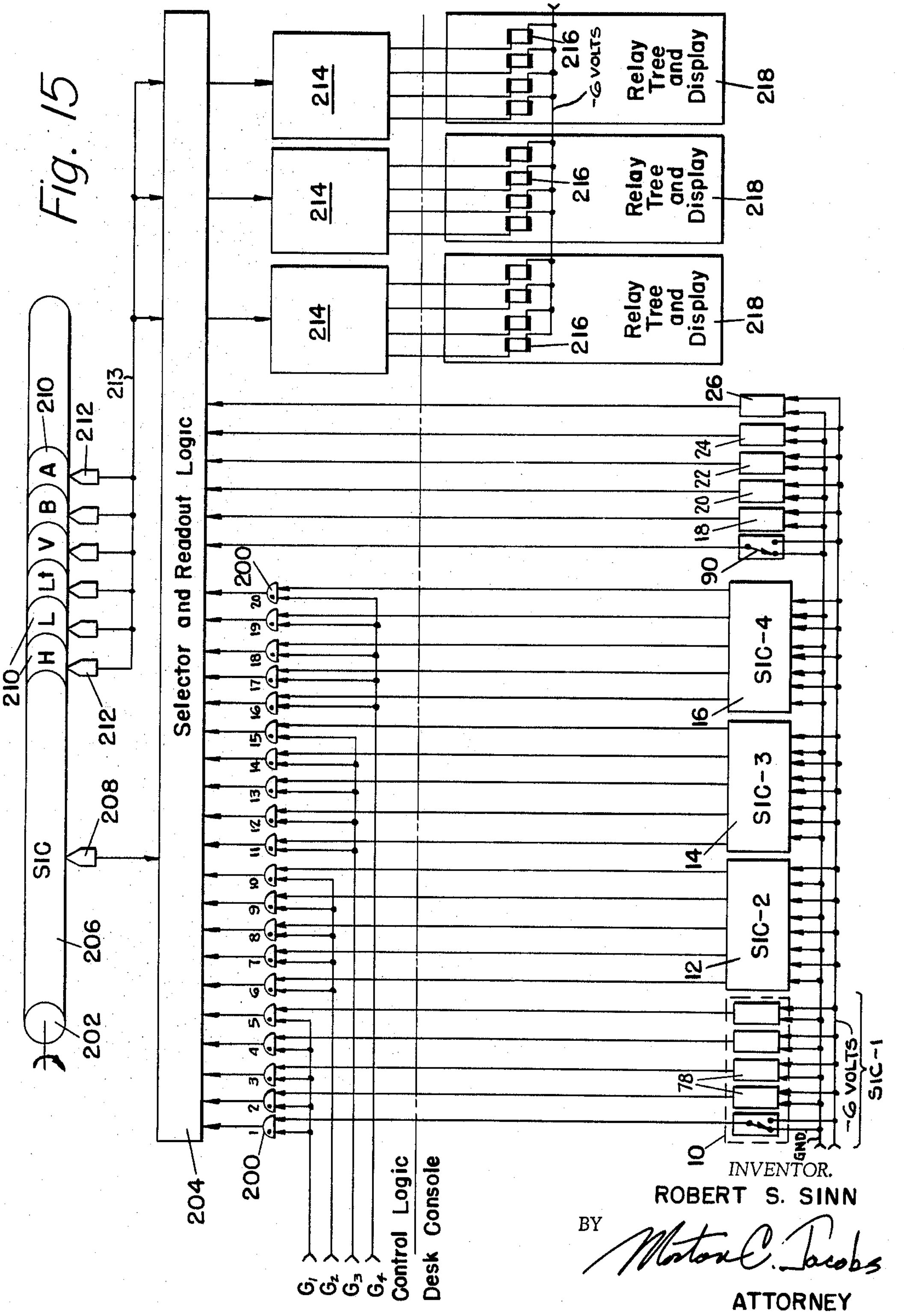

FIGS. 9A–E are a side elevational view of the five code discs that are used in each stock selector wheel;

FIG. 10 is a side elevational view partly in section illustrating a modified form of a desk console embodying this invention and taken on the line 10—10 of FIG. 11;

FIG. 11 is a plan view of the desk console of FIG. 10 with the cover plate cut away;

FIG. 12 is an enlarged side elevational view of the keyboard of FIG. 10 taken on the line 12—12 of FIG. 11;

FIG. 13 is an end elevational view in section of the keyboard taken on the line 13—13 of FIG. 12;

FIG. 14 is an exploded view in perspective of a plurality of keys used in the keyboard of FIG. 12;

FIG. 15 is a schematic block diagram illustrating the electrical connection of the desk console in a data storage system; and FIG. 16 is an enlarged detail view of a portion of FIG. 10.

In the drawing corresponding parts are referenced by the same numerals throughout.

Figures 1, 5:
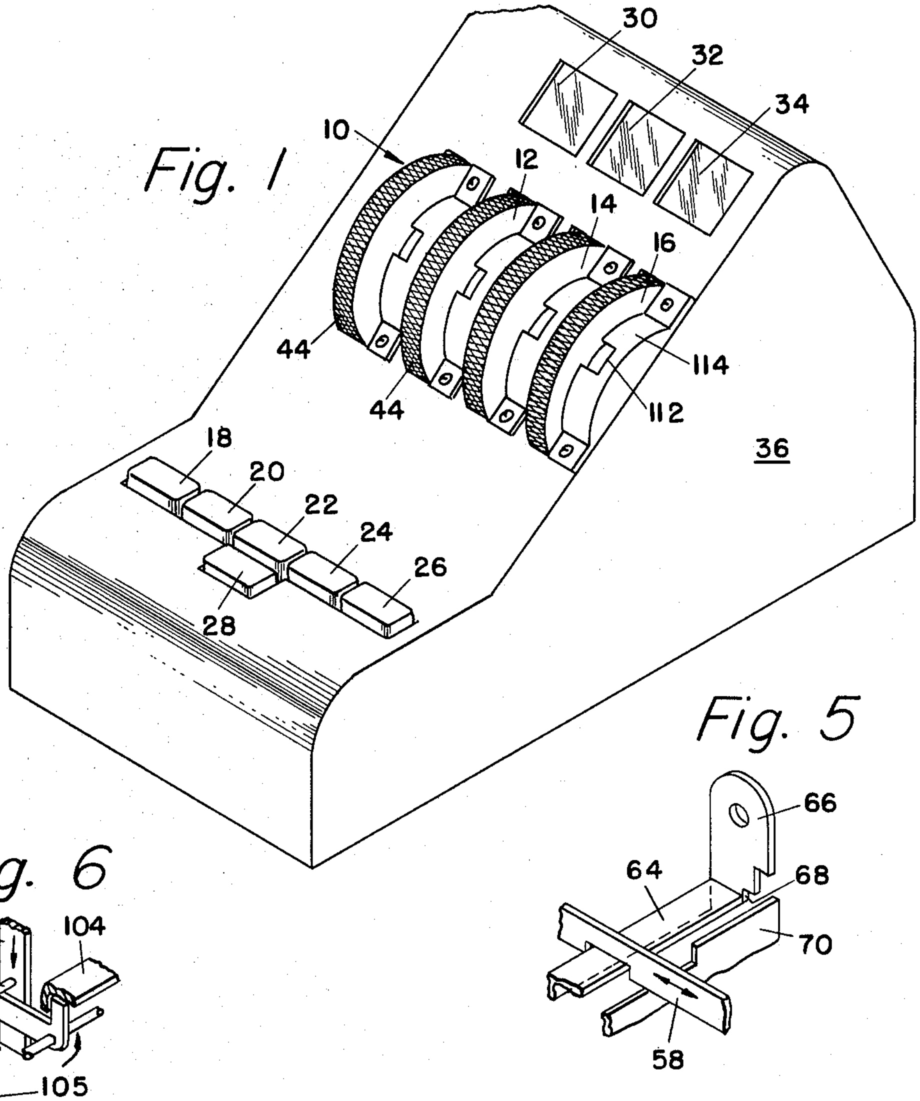
FIG. 1 is a perspective view of a manually operable desk console for a stock information system embodying this invention.
FIG. 5 is an enlarged perspective view of a detail of a latching mechanism shown in the view of FIG. 3.

The manually operable console of FIG. 1 includes four rotatable stock-selector wheels 10, 12, 14, and 16 for establishing the codes used to identify the stocks that are traded on the various exchanges; this identification may be in one, two, three, or four letter codes. A set of five keys 18, 20, 22, 24, and 26 are used to select the desired category of information of the identified stock. These categories may be High, Low, Last, or Close prices, and Volume of stock traded. Other categories such as Bid and Ask prices may also be provided. Another key 28 is a "clear" or release key for the others 18–26. Three windows 30, 32, and 34 in the casing 36 contain display elements, such as those described in the aforementioned copending application, for displaying the information obtained. This display makes use of ten lamps with number screens for 0–9 that are directed to each window 30–34. One of the ten of each window 30–34 is illuminated to display the obtained information. A suitable display device that may be used is described in an article in Product Engineering, October 31, 1960, at page 49; for example, the register tubes "Nixies."

Figure 2:
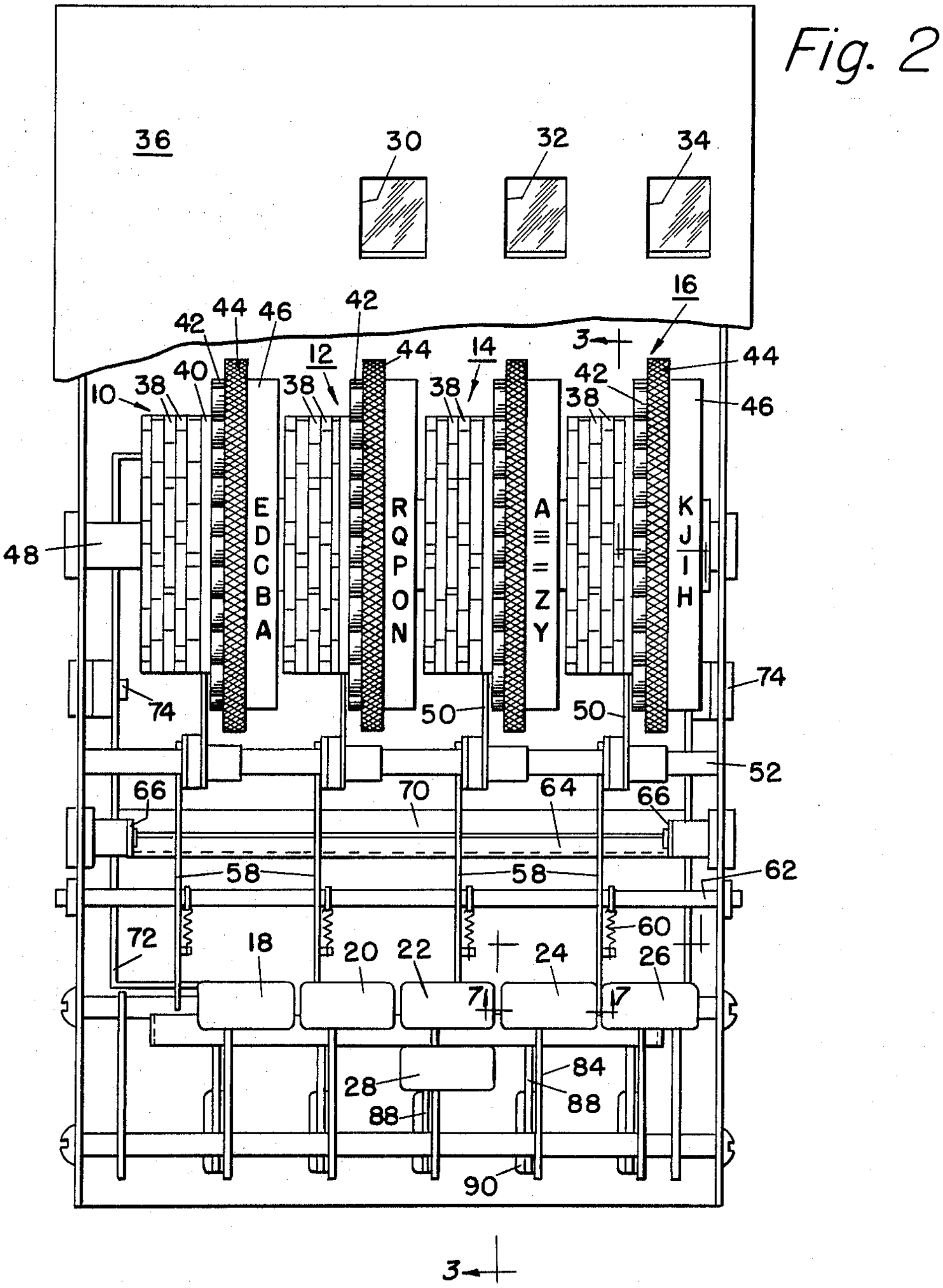
FIG. 2 is a plan view of the console of FIG. 1 with part of the cover plate cut away.

As may be seen in FIG. 2, each of the four selector wheels 10–16 for the stock identifying code (SIC) is composed of a number of discs axially mounted together as a unit. Reading from the left in each wheel unit, there are five different code discs 38 forming a corresponding number of tracks each having a plurality of signal control elements (see FIG. 9), a spacer 40, a detent disc 42, an operating wheel 44 with a knurled periphery, and an indicia disc 46 having SIC characters spaced around its periphery. The units 10–16 are constructed in the same way and are rotatable and individually mounted on a shaft 48 with spacer washers between units as required.

Figure 3:
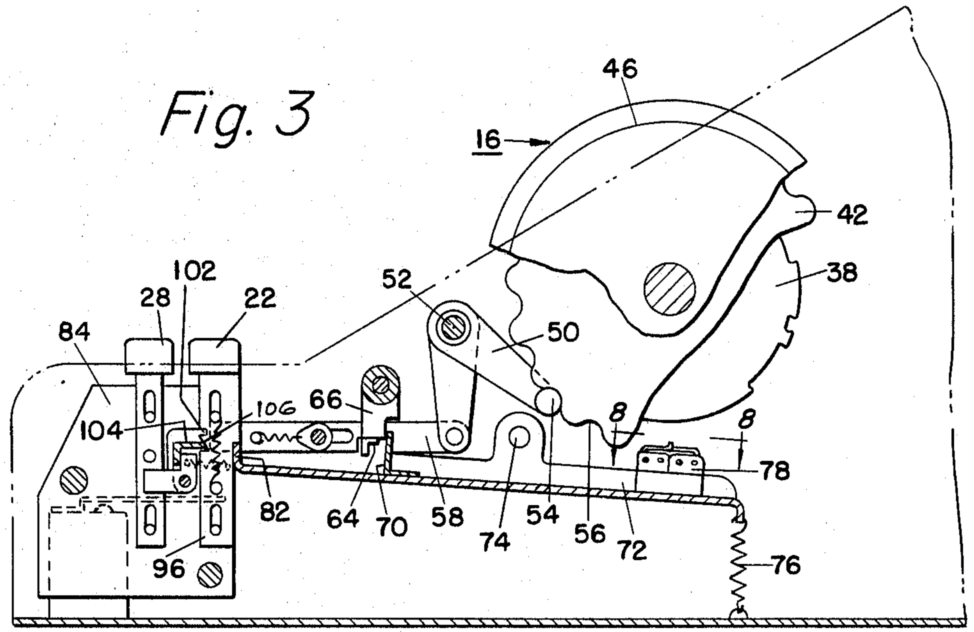
FIG. 3 is a side elevational view taken along the line 3—3 of FIG. 2.
Figure 4:
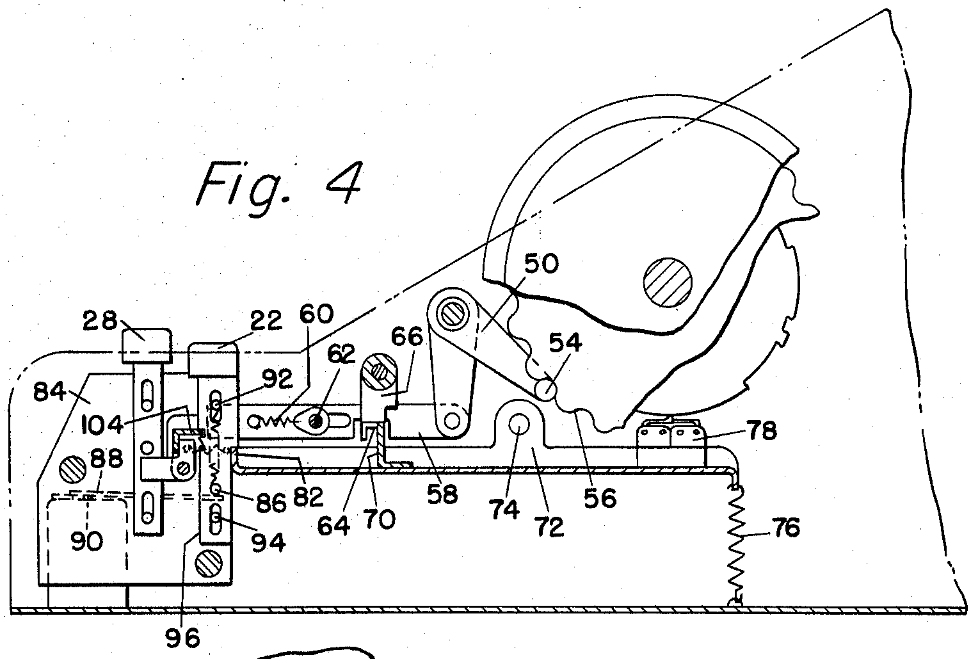
FIG. 4 is a view similar to FIG. 3 with the parts in a different operating condition.

Referring to FIGS. 3 and 4, associated with the four detent discs 42 are four crank detents 50 each formed as an integral pair of levers rotatably mounted on a shaft 52. A cam roller 54 at one end of each crank 50 rides in the detent recesses 56 formed peripherally around the disc 42 (with one recess 56 for each of the twenty-eight SIC characters provided on disc 46). The other end of each crank 50 is pivoted to a release bar 58 which is biased rearwardly (to the right in FIG. 4) by an individual spring 60 connected between the bar 58 and a transverse rod 62 that extends through slots in the release bars 58. The four release bars have slotted under-portions that ride over a freely pivoted angle bar 64 that is used as a latch release. The pivoted end plates 66 of the bar 64 are wider and each has a latching shoulder 68 (FIG. 5) at the lower rear corner thereof which engages the upper end of an angle bar 70. The bar 70 is attached across a pan 72 rotatably mounted on pivots 74 formed in the side walls of the casing 36. The latching plates 66 are moved into position by the weight of the angle bar 64.

Figure 8:
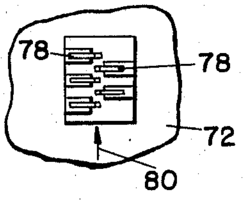
FIG. 8 is a plan view of a group of switches and is taken on the line 8—8 of FIG. 3.
Figure 9A:
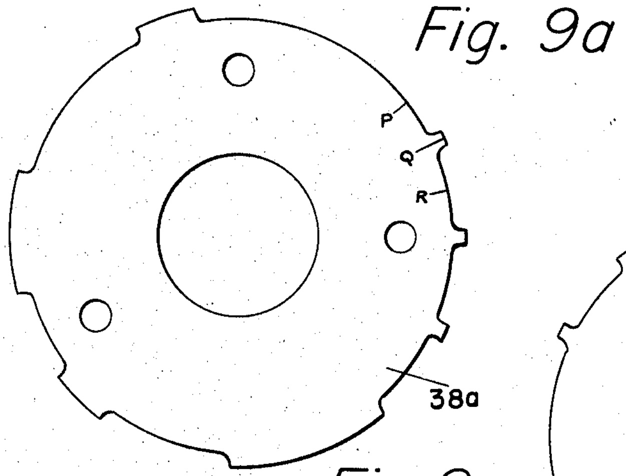
Figure 9B:
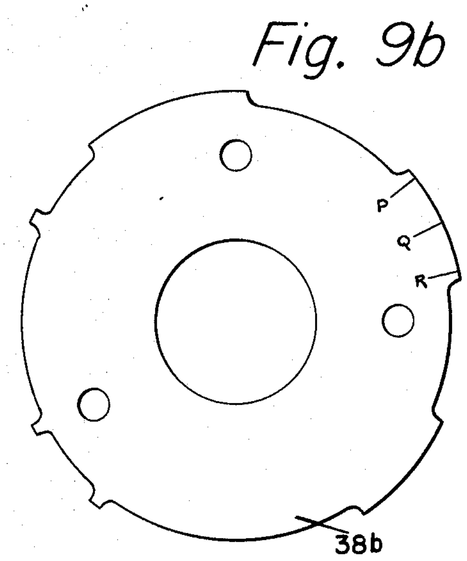
Figures 9C, 9D, 9E:
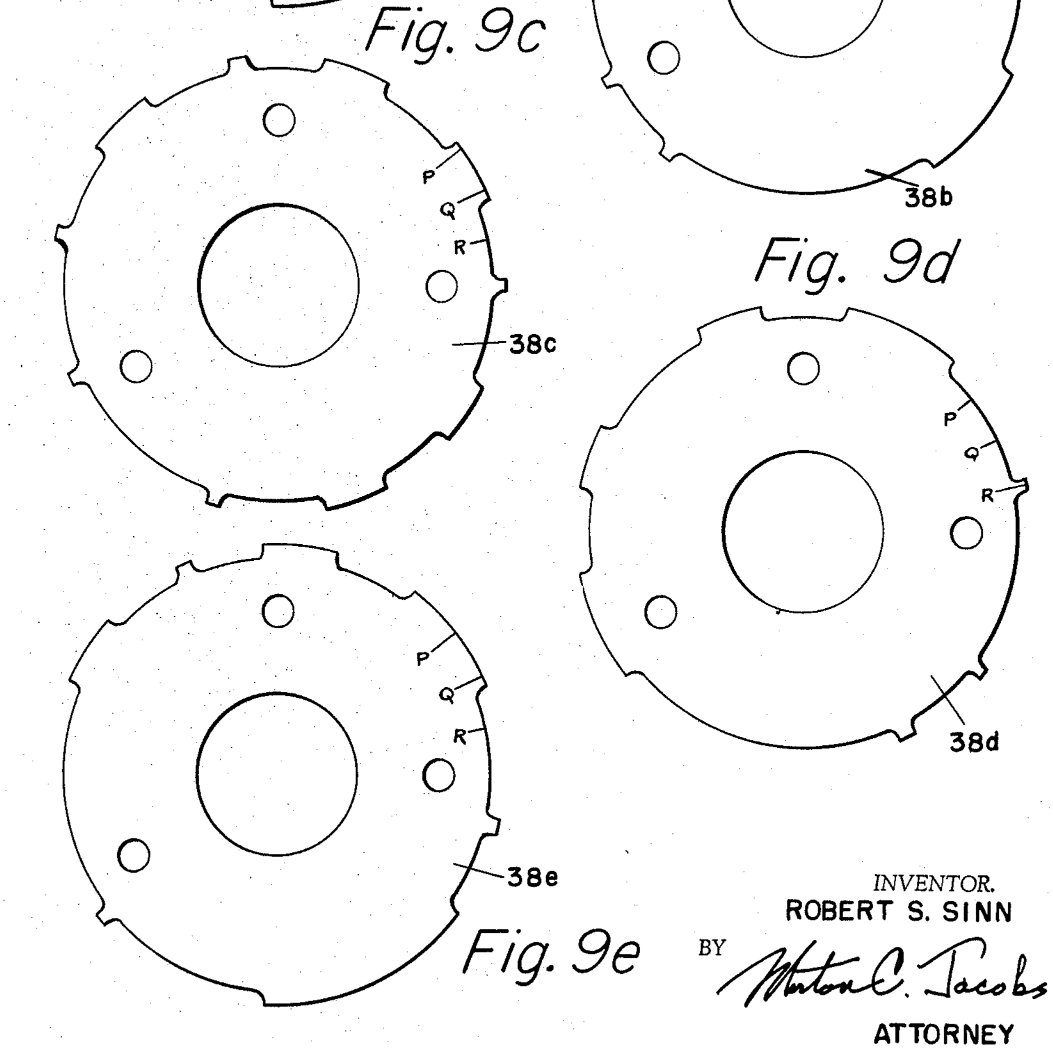

The pan 72 is biased by spring 76 in the clockwise direction as seen in FIGS. 3 and 4, and carries at its end under the code discs 38 four groups of microswitches 78. As shown in FIG. 8, in each group there are three microswitches 78 oriented in a line facing in one direction, and two others interspersed facing in the other direction. The actuating portions of the five switches thereby are positioned along the same line 80. Each group of five switches 78 is positioned under a different unit 10–16 of five code discs 38 to be actuated by those discs.

The five code discs 38 are arranged to have different cutout (or low) portions around the peripheries thereof. Thereby, when mounted as a unit, in each rotary position of the discs 38, there is a different combination of high and low portions facing the actuating line 80 of the switches 78. Where a disc has a high portion, the associated switch 78 is actuated or closed; where it has a low portion, the associated switch 78 is unactuated or open. In the rotary position of pan 72 shown in FIG. 3, the switches 78 are out of actuating position; and as shown in FIG. 4, pan 72 has placed them in position to be engaged and actuated by the code discs 38.

Figure 7:
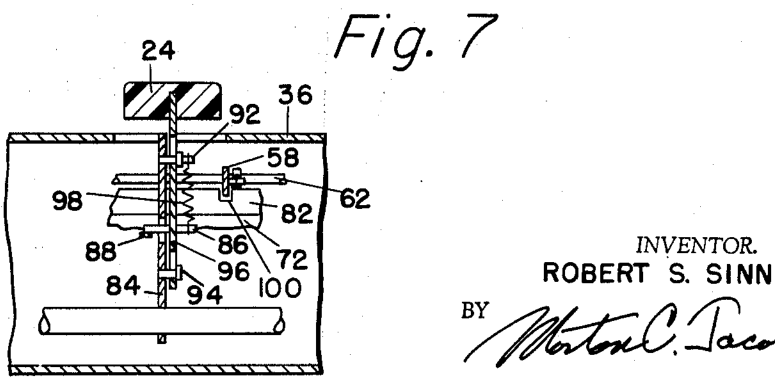
FIG. 7 is an elevational view taken on the line 7—7 of FIG. 2.

The pan 72 is rotated counterclockwise to the position shown in FIG. 4 by one of the keys 18–26 being depressed. A shoulder on the rear edge of each of the keys 18–26 (e.g. the key 22 in FIGS. 3 and 4) engages the forward turned-up lip 82 of the pan 72. When the key 22 is depressed, the pan 72 is rotated to its actuated position. Each key 18–26 is associated with an upstanding mounting plate 84 which is slotted (best seen in FIG. 7) to pass a switch-actuating pin 86 that engages a long arm 88 (FIG. 4) for actuating the associated microswitch 90. Two pins 92 and 94 project from the mounting plate 84 through slots in the plate 96 of each key 18–26 to guide the key as it reciprocates vertically. A spring 98 (FIG. 7) between the pins 86 and 92 biases the key plate 96 upwardly. Each release bar 58 slides in a slot 100 formed in the upper edge of pan lip 82.

Figure 6:
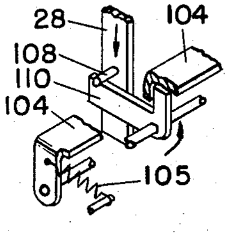
FIG. 6 is an enlarged perspective view of another latching mechanism for the selector switch keys that is shown in FIG. 3.

The front edge of each key plate 96 contains a slot 102 (FIG. 3) that receives the edge of a pivoted latch bar 104 biased by a spring 105 (FIG. 6) in a clockwise direction. Below the slot is the inclined edge of another slot 106, which edge presses the latch bar 104 backwards as the key plate 96 moves down from its position in FIG. 3 to FIG. 4. Since the latch bar 104 is a common latch for all of the keys 18–26, the depression of any one of these keys 18–26, which pivots the latch bar 104 backwards, permits the release of any other key that had been latched in depressed state. The front edges of the release bars 58 engage the rear edge of the latch bar 104, and, when actuated, they actuate the latch bar in turn. The release key 28 is mounted for reciprocating movement and is spring biased upwardly. When depressed, a pin 108 (FIG. 6) pivots a rocker arm 110 around the axis of latch 104 to pivot the latter out of its latching position and release any of the keys 18–26.

In operation, a stock is selected by rotating the knurled discs 44 (FIG. 2) until the desired stock identifying characters on the indicia discs 46 appear in the windows 112 (FIG. 1) of cover plates 114. The detent cam rollers 54 (FIGS. 3, 4) retain the disc units in their selected positions until changed. One of the selector keys 18–26 is depressed to select the desired category of information, and the selected information is obtained from a central storage unit and displayed in the windows 30, 32, and 34.

When a key 18–26 is depressed, the pan 72 (FIGS. 3, 4) is pivoted counterclockwise to move the four groups of switches 78 into actuating position with respect to the four sets of code discs. The pivoted latch plates 66 engage the upper edges of bar 70 and latch the pan in actuated position. For each rotary position of one unit 10–16, a unique combination of conditions of the five switches 78 is obtained; this is indicated by an examination of the five code discs 38a–e in FIG. 9 that make up each unit. The four units 10–16 establish a unique code combination in the twenty switches 78 that are actuated or left unactuated by a selection of an identifying character in each unit 10–16. This unique combination of twenty switches establishes the address of the storage unit at which the desired information is stored as explained in the aforementioned copending application. The selector switches 18–26 determine which of certain bins of information are to be read out.

Different ones of the keys 18–26 may be depressed in succession to obtain an entire gamut of information about a desired stock. The release bars 58 are not affected by this movement of the keys 22, nor by their release by clear key 28. Accordingly, the detent rollers 54 retain the units 10–16 in position, and the switches 78 are similarly unaffected.

When one or more of the units 10–16 are rotated, the associated detent roller rides out of the detent recess 56 to rotate the crank 50 and actuate the release bar 58. The latter bears against the latch bar 104 to rotate it out of latching condition and release the depressed key 18–26. This frontward movement of the release bar 58 also moves angle bar 64 frontwardly to pivot the latching plates 66 and release the pan 72. The latter is pivoted out of actuating position so that the switches 78 are not actuated as the code discs are rotated. With this arrangement, flickering of display indicators and other transients due to opening and closing of the switches are prevented. Moreover the switches are only actuated by the radial forces of the code discs 38 as the pan 72 is moved into position; injurious effects are avoided of the discs 38 striking the switches 78 during rotation which ensures a long operating life. The release of the selector key 18–26 does not release the switch pan 72; but the keys 18–26 are released by a change of the code units 10–16. Thereby, the display is always initiated by the operator depressing one of the selector keys 18–26.

The stock identifying units 10–16 are quickly and easily adjusted by fingertip control. Once adjusted, the indicia discs 46 continue to identify the stock, and the depressed key 18–26 identifies the category of information being displayed.

A modified form of the invention is shown in FIGS. 10–13. Each of five stock identifier units 10–16 is similarly constructed of an insulating plastic wheel 118 having an enlarged detent disc portion 120 with detent recesses 122 spaced around its periphery in the manner described above. A cam roller 124 secured to the end of a spring-biased detent crank 126 rolls in and out of successive recesses 122 as the disc 120 is rotated. The disc 120 projects out of the casing 128 and its recesses 122 are directly engageable by the operator's finger to easily adjust its rotary position.

Two spaced conductive bands 130 and 132 (FIG. 11) are mounted on the periphery of a reduced portion of the wheel 118. The wider 130 of the bands is formed with combinations of holes and the absence of holes through the band along three tracks at spaced axial positions. The other 132 of the bands has two such tracks of holes and the absence of holes. The two bands 130 and 132 have their respective lines of holes aligned to form different five-track digital combinations at each rotary position corresponding to one of the detent recesses 122 (FIG. 10). The combinations of holes and the absence of holes may be the same as high and low disc portions shown in FIG. 9.

Between the bands 130 and 132 is an enlarged cylindrical disc portion 134 around the periphery of which indicia are provided for the different code combinations of holes. The portion 134 may be formed integral with the wheel portions on which the band 130 and 132 are mounted, and the detent disc 120 may be separately formed and attached to form the stock identifier wheel unit 118.

Five axially-positioned wiper brushes 136 (FIGS. 10, 11) engage the conductive bands 130 and 132 and ride on the peripheries thereof in the spaced tracks in which the holes are formed. Two other wiper brushes 138 (only one of which is visible in FIG. 10) respectively engage the bands 130 and 132 and are connected to a common electrical ground return. The brushes 136 are positioned to engage the band 130 and 132 aligned with a detent recess 122 which is the location of the coded holes when the unit 118 is latched by the detent roller 124; however, the brushes 138 are positioned to engage between the holes, i.e. aligned with a lobe under such circumstances to ensure that the metal bands 130 and 132 are electrically connected to ground when the bands are held by the detents 124 in operating condition.

Thereby, the absence of a hole in a band 130 is essentially equivalent to a closed switch since the associated wiper 136 is connected to ground via wiper 138. The presence of a hole is akin to an open switch since the associated wiper is connected to the insulating wheel 118 through the hole. Thus, each of the five wiper brushes 136 is electrically connected to ground or is floating electrically depending upon the presence or absence of a hole in the associated track and at the corresponding position of rotation.

As shown in FIG. 16 the holes in the bands 130 and 132 are filled with plastic plugs 139 that extend into holes drilled into the wheel 118. These plugs are smoothed down to the surface level of the bands so that a smooth transition of movement of the wipers 136 takes place between hole and band.

As shown in FIGS. 12 and 14, a double bank of selector keys 140 and 142 is provided. The keys 140 and 142 are thin L-shaped plates having a slender stem portion with a finger-engaging cap 144 at the top thereof and a base portion 146 whose width is the width of the two rows of keys. Depending from the central portion of the base 146 is a symmetrical latching portion 148 having square slots 150 and 151 along opposite edges thereof. Also along opposite edges are inclined curved camming portions 152 and 153 therebelow which lead into shoulder stop portions 154 and 155, respectively.

A pivoted latch bar 156 (FIGS. 12, 13) extends the length of the keyboard and normally engages against the shoulder 154 or 155 of each key 140 or 142 which is biased upwardly by a coil spring 160. The spring 160 encircles the stem of each key and bears between a cross key 158 in a slot in the stem thereof and a housing plate 164. A coil spring 161 biases the latch bar 156 against the profile of the latching portion 148 of the keys. The stem of each key is guided in slots in spaced upper and lower plates 162 and 164 which are mounted between side plates 166 and 168 that form an enclosure for the keyboard. The latter plates 166 and 168 have window portions 170 adjacent the coil springs 160 to avoid binding of the springs. The four detent cranks 126 bear against the latch bar 156, and, when actuated, they, in turn, pivot the latch bar 156.

As shown in FIG. 14, the keys 142 have the same symmetrical latching profile 148 as the keys 140 and are mounted within the plates 162 and 164 in opposing relation so that the latching slots 150 and cam portions 152 of the keys 140 are aligned with slots 151 and cams 153 of keys 142. With this arrangement, but a single shape of key is required, and they are all operated with a common latch bar 156.

The under-portion of the base 146 of the key 140 engages a spring arm 172 (FIG. 12) as it moves downwardly, which arm 172 is connected to operate a microswitch 174. The symmetrical shoulder on the other side of the base 146 permits the keys 142 to operate the associated switch actuator arms 172, all of which are located on the same side of the keyboard. Thereby, the switches 174 for the battery of keys may all be connected on the same side of the keyboard and positioned conveniently to make connections thereto.

In operation, when a key 140 is moved downwardly, the latch bar 156 is pivoted clockwise (as seen in FIG. 12) by the camming surface 152, and it is latched in the slot 150 to retain the key 140 in depressed condition. Upon the depression of any other key, such as the key 142, its symmetrical camming surface 153 pivots the latch bar 156 out of position to release the previously depressed key 140. The slot 151 of the newly depressed key 142 is latched by the latch bar 156 in the manner described above.

As shown in FIG. 14 a release key 176 is provided of the same general construction as the other keys 140 except that the slots 150 and 151 are not formed therein so that the upper portion of the latching profile 148 is straight. The camming surface 152 or 153 of the release key is effective, when the key is depressed, to pivot the latch bar 156 out of latching position to release any depressed key; and in the absence of a latching slot 150 or 151, the release key is restored to its normal position by its associated spring 160.

As shown in FIGS. 12 and 13, a plurality of freely pivoted camming elements 180 are pinned to the plate 166. These camming elements 180 have a wide lower portion substantially equal to the distance from a center point of thickness of one key plate to the corresponding point on the adjacent key. These cam elements 180 are bottle-shaped, have rounded camming portions at the shoulders 182, are pivoted at the narrow necks 184, and are tangential along a line on which the widest portions are placed. The cams 180 may be pivoted to be at a point equidistant between adjacent keys. Stops 186 and 188 are fixed circular pins at each end of the series of cams 180 with the pin diameter along the tangential cam line. The pins 186 and 188 are spaced from the end cams by about half the thickness of the key plates. One cam 180 is provided for each of the keys 140 and 142 to be controlled. Each key 140 or 142 is positioned to have its base portion 146 passed between two adjacent cams 180 or, in the case of the end keys, between the end cams 180 and the associated stop pins 186 and 188.

In operation, only one of the keys 140 and 142 is permitted to have its base 146 pass between two of the cams 180. The total space available between the widest parts of any two of these cams is the width of the key 140 or 142 due to the spacing at the stop pins 186 and 188. The cams 180 themselves are in tangential contact in their normal freely hanging condition. When one of the keys 140 or 142 is depressed, its base 146 moves between the associated cams 180 to pivot them out of the way with the available space being taken up by that depressed key. If a second key should be depressed at that time, its base engages against the shoulder portions 182 of the associated cams 180, and since there is no more space in which these cams are free to pivot, the key's downward movement is blocked. Since the bases 146 of both keys 140 and 142 are symmetrical at opposite ends, they are both effective to engage the single row of cams. Thereby, the lockout cams 180 provide a common interlock for the entire operating keyboard and for both rows of keys 140 and 142 as well. The release keys 176 at the ends of the keyboard are not affected by the lockout cams 180.

Referring back to FIG. 10, the cranks 126 actuate the latch bar 156 to release a depressed key 140 or 142 whenever a wheel unit 118 is rotated. Moreover, if a wheel unit is not positioned properly (say, if it is rotated to an intermediate position with the detent 124 resting on a lobe), the latch bar 156 is actuated so that the keys 140 and 142 cannot be latched. The operator's attention is called to this condition when he feels that a key 140 or 142 does not stay depressed, and he can correct the position of the wheel unit 118.

The overall operation of the embodiment of FIGS. 10–14 is somewhat similar to that of FIGS. 1–9. The selection of a stock is by means of the four wheels 118, which set up twenty electrical switching relationships and corresponding SIC signals to represent the selected stock . The category of information is selected by the keys 140 and 142 and the associated switches 174. When the stock selection is changed, the detent cranks 126 actuate the release of the selector keys 140 and 142; thereby full electrical connection is made to the data storage system only when the selection is complete, as is described below. The display of the information in this embodiment is similar to that described above, so that the display may be conveniently correlated with the selector settings.

Control logic is shown in FIG. 15 for connecting a desk console to a storage system to which many such consoles may be connected. The separation of the control logic from the electrical connections in the desk console are indicated by a broken line.

The five switches 78 for each of the four stock-selector wheels 10, 12, 14 and 16 are shown represented as single-pole double-throw switches that are actuated between contacts at ground and —6 volts, respectively. The category selector switches 90 and associated selector keys 18–26 are connected electrically in a similar fashion. The signals derived from switches 78 are in binary digital form.

The outputs of the twenty switches 78 for the SIC selectors 10–16 are connected to twenty coincidence gates 200 arranged in four groups of five each. The gates #1–5 are gated by gating signal C–1, gates #6–10 by G–2, gates #11–15 by G–3, and gates #16–20 by G–4. The timing signals G–1 to G–4 occur in succession in repeated cycles in synchronism with the operation of a magnetic drum memory 202. The outputs of the gates 200 and of the selector switches 90 for the selectors 18–26 are all connected to a selector and read-out logic control 204.

The logic control 204 is shared by a plurality of desk consoles and functions to communicate with each of them in succession for access to the drum memory 202. In the memory 202, there are SIC identification signals in binary form stored in a bin 206 of a plurality of magnetic recording tracks that are read by magnetic recording heads symbolized by head 208 and supplied to the control logic 204. Other bins 210 on the drum 202 store information signals in the various categories of stock transaction information such as High, Low, Last, etc. The binary signals in these bins are read by recording heads 212, and the signals supplied through a multi-conductor cable 213 to the control logic 204 for distribution to three sets of registers 214. Each set of registers, in turn, supplies the information signals to a set of relays 216 which decode the signals to a decimal form for energization of a display 218. Each display 218 may be in the form of ten lamps (not shown) that represent the ten decimal digits 0–9. One of the lamps in each display 218 is energized in accordance with the signals supplied to the associated set of relays 216. Thereby, a display of three decimal digits indicates the desired information of the selected stock.

The operator merely selects the four stock identifier letters by the wheels 10–16 and one of the category selectors 18–26. Thereby, the switches established a representative set of binary signals for the SIC. The timing signals G–1 to G–4 feed the binary signals to the logic control which gains access to the memory 202 at an appropriate time consistent with the requests of other consoles. The SIC signals in the memory bin 206 are compared with those fed through the gates 200. When coincidence is obtained, the bins 210 at the corresponding memory location contain the associated information signals. The information signals corresponding to the category selected by one of the keys 18–26 are read out under the logic control 204 and directed to the registers 214. The displays 218 present in three decimal digits the information represented by the signals in the category read out.

The operator may correlate at all times the displayed information with the SIC selector wheel settings and the category selector key settings. The selector settings are continuously on display together with the information obtained in accordance with those settings. Furthermore, the settings are not changed except at the operator's desire.

Details of the construction of the logic control and drum memory 202 are set forth in the aforementioned copending patent application. The operation is likewise there set forth.

The console embodiment of FIGS. 10–14 may be used in the system of FIG. 15 in a similar fashion. The conductive bands 130 and 132 and wipers 136 are effective as switch connections to ground. The positioning of the wipers 136 at an insulated hole is effective as an open switch, which presents a floating voltage level instead of the —6 volts shown in FIG. 15; however, electrically the equivalent effect may be obtained. Likewise, the switches 174 of the selector keys 140 and 142 may be connected in a similar fashion. The operation is otherwise the same as that described above.

Thus, this invention provides a manually operable data selection system for obtaining information from a data storage system. The information to be obtained may be readily selected, and, when obtained, it is conveniently displayed to the operator and correlated with the selection that was made.

What is claimed is:

1. In a stock transaction information system, a manually operable stock selector device for establishing combinations of electrical signals representative of pluralities of stocks, said device comprising a plurality of manually rotatable members each having a plurality of tracks with a plurality of signal control elements in each track, said control elements of the tracks of each rotatable member being arranged in a plurality of combinatorial groups dependent upon the position of rotation of the respective member, signal producing means individually associated with said tracks of each rotatable member and arranged for deriving parallel combinations of signals in accordance with the signal control element combinatorial groups thereof, and indicia for each of said rotatable members to represent each of said combinatorial groups by an alphabetic character.

2. A selector device as recited in claim 1 and further comprising a plurality of settable elements for selecting a category of price and volume information, and means responsive jointly to said signal producing means and to said settable elements for obtaining the selected information.

3. A manually operable selector device comprising a plurality of rotatable members each being manually operable and having detent and signal-producing portions, a plurality of manually operable push-button switch actuators, a latch for releasably retaining said actuators in actuated position, and detent means for engaging said detent portions to releasably retain said rotatable members in certain rotary positions, said detent means including means for releasing said actuator latch upon a change in rotary position of any of said rotatable members.

4. A manually operable selector device as recited in claim 3 wherein said signal producing portions include a plurality of switch actuating elements arranged around said rotatable members, and further comprising pluralities of switches individually corresponding to said members, and means for supporting said switches in operating relation to said switch actuating elements of the corresponding ones of said members.

5. A manually operable selector device as recited in claim 4 wherein said switch supporting means includes means for moving said switches out of said operating relation upon a change in rotary position of a said rotatable member.

6. A manually operable selector device as recited in claim 5 wherein said switch supporting means includes means for moving said switches into said operating relation upon operation of said switch actuators.

7. In a stock information system comprising a cyclic memory for storing signal combinations representative of numerical stock information in accordance with signal storage addresses corresponding to a multi-character stock identifier code in which each character is formed as a combination of identifier switching signals and to information categories each corresponding to a different category switching signal, and means for obtaining information signal combinations from said memory in accordance with said identifier and category switching signals; a manually operable console including several pluralities of settable switches, each of said switch pluralities corresponding to a respective character of said multi-character stock identifier code, separate manually operable means for selectively actuating and latching each plurality of switches combinatorially to establish different ones of said identifier switching signal combinations and for indicating the character corresponding to the settings of the respective plurality of switches, a plurality of settable switches each corresponding to a different one of said information categories, separate manually operable means for selectively actuating and latching said category switches and for indicating the category corresponding to the setting thereof, and a plurality of selectively changeable numerical display devices each having means for displaying all of the numerical digits and responsive to various ones of said information signal combinations for displaying corresponding ones of the numerical digits, said display devices and indicating means being adjacently located on said console for concurrent viewing by an operator, whereby the operator can relate the displayed information to the switch settings.

8. The combination as recited in claim 7 wherein said console includes a casing, and said display devices and indicating means are located at one face of said casing.

9. The combination as recited in claim 7 wherein said means for actuating and latching said category switches includes a plurality of mechanically latchable keys.

10. In a stock information system comprising a cyclic memory for storing signal combinations representative of numerical stock information in accordance with signal storage addresses corresponding to a multi-character stock identifier code in which each character is formed as a combination of indentifier switching signals, and means for obtaining information signal combinations from said memory in accordance with said identifier switching signals; a manually operable console including several pluralities of settable switches, each of said switch pluralities corresponding to a respective character of said multi-character stock identifier code, manually operable means for actuating and latching each plurality of switches combinatorially to establish different ones of said identifier switching signal combinations and for indicating the character corresponding to the settings of the respective plurality of switches, and a plurality of selectively changeable numeral display devices each responsive to various ones of said information signal combinations for displaying corresponding numerical digits, said display devices and indicating means being adjacently located on said console for concurrent viewing by an operator.

11. In a stock information system comprising a cyclic memory for storing signal combinations representative of numeral stock information in accordance with signal storage addresses corresponding to a multi-character stock identifier code in which each character is formed as a combination of identifier switching signals and to information categories each corresponding to a different category switching signal, and means for obtaining information signal combinations from said memory in accordance with said identifier and category switching signals; a manually operable console including several pluralities of settable switches, each of said switch pluralities corresponding to a respective character of said multi-character stock identifier code, means for actuating and latching each plurality of switches combinatorially to establish different ones of said identifier switching signal combinations, a plurality of settable switches each corresponding to a different one of said information categories, means for actuating and latching said category switches individually and for indicating the category corresponding to the setting thereof, and a plurality of selectively changeable numerical display devices each responsive to various ones of said information signal combinations for displaying corresponding numerical digits, said display devices and indicating means being adjacently located on said console for concurrent viewing by an operator.

12. A stock information system comprising a plurality of selector devices, each of said devices including a positionable member for carrying a plurality of indicia and a rotatable unit coupled to said positionable member, said rotatable unit having a plurality of tracks each having a plurality of signal control elements, said elements being arranged in combinatorial groups having one element from each of said tracks in similar positions of rotation; a display panel adjacent to said positionable members arranged for displaying each of said positionable members so that a single indicia from each of said positionable members may be displayed in a selected combination; manually operable means for moving each of said positionable members so that said selected combination of indicia is displayed; a plurality of signal deriving means individually associated with said tracks and arranged for deriving parallel combinations of signals in accordance with said combinatorial groups of signal control elements; a display means selectively changeable in response to information signals; means for supplying information signals to said display means; and means responsive to said parallel combinations of signals to control the supply of information signals from said supplying means to said display means.

13. The combination of claim 12 wherein said signal control elements include a plurality of switch actuating elements, and each of said signal deriving means includes a switch.

14. The combination of claim 12 wherein said signal control elements include a plurality of conductive and non-conductive portions, and each of said signal deriving means includes a conductive brush arranged to wipe over said conductive and non-conductive portions.

15. The combination of claim 12 wherein said display means are located on said display panel adjacent to the display indicia of said positionable members whereby an operator can relate the displayed information to said selected combination of indicia.

16. The combination of claim 15 wherein a portion of said manually operable means are located in said panel whereby said operator may readily select other combinations of indicia.

17. In a stock information system including a source of stock information signals, information concerning different stocks being identified by a multi-character stock identifier code each character of which is formed as a combination of identifier switching signals, means for selecting and displaying information on a particular stock which comprises a plurality of character selectors corresponding to respective characters of said multi-character stock identifier code and each including a movable unit, said movable unit having a plurality of tracks each having a plurality of signal control elements, a plurality of signal producing means including switches associated with respective tracks and arranged for actuation by the signal control elements thereof, said signal control elements being arranged to actuate said switches in different combinatorial groups in different positions of the movable unit to produce corresponding parallel combinations of signals from the signal producing means associated therewith, means for manually actuating said character selectors to change the positions of said movable units, a plurality of character display means associated with said selectors, respectively, for displaying the characters corresponding to the settings thereof, a stock information display means adjacent said character display means and selectively changeable in response to information signals from said source, and means utilizing said parallel combinations of signals established by the selectors for supplying information signals on the corresponding stock to said stock information display means.

References Cited by the Examiner

UNITED STATES PATENTS

| | | | |
|---|---|---|---|
| 2,132,684 | 10/1938 | Gardner | 340—152 |
| 2,134,626 | 10/1938 | Shipton et al. | 179—90.2 |
| 2,146,269 | 2/1939 | Peurner | 200—5 |
| 2,234,405 | 3/1941 | Hall et al. | 200—5 |
| 2,358,586 | 9/1944 | Newell | 340—345 |
| 2,794,081 | 5/1957 | Luhn | 200—14 |

NEIL C. READ, *Primary Examiner.*